United States Patent
Seeley

(10) Patent No.: US 11,162,676 B2
(45) Date of Patent: Nov. 2, 2021

(54) HEAD ASSEMBLY FOR A RADIANT BURNER

(71) Applicant: Edwards Limited, West Sussex (GB)

(72) Inventor: Andrew James Seeley, Bristol (GB)

(73) Assignee: Edwards Limited, Burgess Hill (GB)

( * ) Notice: Subject to any disclaimer, the term of this patent is extended or adjusted under 35 U.S.C. 154(b) by 651 days.

(21) Appl. No.: 14/904,964

(22) PCT Filed: Jun. 16, 2014

(86) PCT No.: PCT/GB2014/051841
§ 371 (c)(1),
(2) Date: Jan. 14, 2016

(87) PCT Pub. No.: WO2015/008022
PCT Pub. Date: Jan. 22, 2015

(65) Prior Publication Data
US 2016/0146458 A1 May 26, 2016

(30) Foreign Application Priority Data
Jul. 17, 2013 (GB) ..................................... 1312762

(51) Int. Cl.
*F23D 14/20* (2006.01)
*F23D 14/50* (2006.01)
(Continued)

(52) U.S. Cl.
CPC .............. *F23D 14/12* (2013.01); *B23P 15/00* (2013.01); *F23D 14/20* (2013.01); *F23D 14/50* (2013.01);
(Continued)

(58) Field of Classification Search
CPC ........... F23G 2209/14; F23G 2209/142; F23G 7/06; F23G 2201/303; F23C 5/08
(Continued)

(56) References Cited

U.S. PATENT DOCUMENTS

| 1,391,338 | A | * | 9/1921 | Morse | ...................... | F23C 5/02 |
| | | | | | | 431/189 |
| 2,150,532 | A | * | 3/1939 | Wiegand | .................. | B01J 6/002 |
| | | | | | | 432/112 |
| 2,689,605 | A | * | 9/1954 | Hess | ....................... | F23D 11/00 |
| | | | | | | 431/179 |
| 2,806,521 | A | * | 9/1957 | Blaha | .................... | F23D 14/125 |
| | | | | | | 431/348 |

(Continued)

FOREIGN PATENT DOCUMENTS

| CN | 1656312 A | 8/2005 |
| CN | 201306718 Y | 9/2009 |
| DE | 9400048 U1 | 5/1995 |
| EP | 0694735 A1 | 1/1996 |

(Continued)

OTHER PUBLICATIONS

First Office Action from European Patent Office in European Patent Application No. 14732602.9 dated Jun. 1, 2017, 6 pgs.
(Continued)

*Primary Examiner* — Jorge A Pereiro
(74) *Attorney, Agent, or Firm* — Theodore M. Magee; Westman, Champlin & Koehler, P.A.

(57) ABSTRACT

A head assembly for a radiant burner, an inlet assembly and a method are disclosed. The head assembly is for a radiant burner. The head assembly may include a housing defining a plurality of identical housing apertures extending therethrough, an insulator received by the housing and defining a corresponding plurality of identical, complimentarily-located insulator apertures extending therethrough, and at least one inlet assembly configured to be received by one of the identical housing apertures. Each inlet assembly may include a housing portion configured to be received by the one of the identical housing apertures, and an insulator portion configured to fill the complimentarily-located insulator aperture. In this way, a head assembly is provided (Continued)

which has a number of apertures, any of which may receive an inlet assembly. Given that each inlet assembly is configured to be received by any of the apertures, this provides flexibility for the insertion and removal of the assemblies, without needing to completely disassemble the head assembly from the radiant burner. Also, by forming the inlet assembly with a housing portion and insulation portion, the assembly can be located within the head assembly and the insulating portion prevents heat damage.

10 Claims, 4 Drawing Sheets

(51) Int. Cl.
  *F23G 7/06* (2006.01)
  *F23D 14/12* (2006.01)
  *B23P 15/00* (2006.01)

(52) U.S. Cl.
  CPC .... *F23G 7/065* (2013.01); *F23D 2900/00002* (2013.01)

(58) Field of Classification Search
  USPC .......................................................... 431/5
  See application file for complete search history.

(56) References Cited

U.S. PATENT DOCUMENTS

| | | | | |
|---|---|---|---|---|
| 3,063,803 A * | 11/1962 | Fujise | C01C 3/0212 | 423/375 |
| 3,719,471 A * | 3/1973 | Jones | C22B 15/0006 | 266/146 |
| 4,092,095 A * | 5/1978 | Straitz, III | F23D 14/24 | 431/114 |
| 4,194,454 A * | 3/1980 | Lalanne | F23G 7/001 | 110/238 |
| 4,207,066 A * | 6/1980 | Weldon | C21D 9/00 | 432/137 |
| 4,287,857 A * | 9/1981 | Schnitzer | F23D 11/441 | 122/23 |
| 4,516,510 A * | 5/1985 | Basic, Sr. | F23G 5/165 | 110/210 |
| 5,131,840 A * | 7/1992 | Zettner | F23C 3/00 | 431/353 |
| 5,310,334 A * | 5/1994 | Spiros | F23D 14/32 | 110/215 |
| 5,338,186 A * | 8/1994 | Sulzhik | F23D 14/125 | 431/115 |
| 5,510,093 A | 4/1996 | Bartz et al. | | |
| 5,599,371 A * | 2/1997 | Cain | C03B 19/1423 | 65/17.4 |
| 5,772,421 A * | 6/1998 | Besik | F23D 14/22 | 431/8 |
| 5,891,404 A * | 4/1999 | Ibaraki | B01D 53/68 | 422/168 |
| 5,900,217 A * | 5/1999 | Hartung | B01D 53/46 | 422/171 |
| 5,935,283 A * | 8/1999 | Sweeney | B01D 45/00 | 261/112.1 |
| 6,076,493 A | 6/2000 | Miller et al. | | |
| 6,153,150 A * | 11/2000 | Moore | B01D 47/06 | 422/110 |
| 6,161,500 A * | 12/2000 | Kopacz | C23C 16/45514 | 118/723 E |
| 6,164,956 A | 12/2000 | Payne et al. | | |
| 6,238,205 B1 | 5/2001 | Svedlund | | |
| 6,238,206 B1 * | 5/2001 | Cummings, III | F23D 14/24 | 431/10 |
| 6,261,524 B1 * | 7/2001 | Herman | B01D 47/06 | 422/173 |
| 6,298,667 B1 * | 10/2001 | Glynn | F23R 3/002 | 29/889.2 |
| 6,423,284 B1 * | 7/2002 | Arno | B01D 53/68 | 423/240 R |
| 6,442,929 B1 * | 9/2002 | Kraft | F02C 7/266 | 313/145 |
| 6,581,386 B2 * | 6/2003 | Young | B23P 6/00 | 29/890.01 |
| 6,635,228 B1 * | 10/2003 | Moore | B01D 53/323 | 422/186.04 |
| 7,700,049 B2 * | 4/2010 | Clark | B01D 53/38 | 422/171 |
| 7,892,506 B2 * | 2/2011 | Seeley | F23C 99/006 | 110/342 |
| 8,375,548 B2 * | 2/2013 | Stastny | F23R 3/28 | 29/402.08 |
| 9,157,638 B2 * | 10/2015 | Ponziani | F23R 3/60 | |
| 2002/0192610 A1 * | 12/2002 | Takemura | F23G 7/065 | 431/87 |
| 2003/0024389 A1 * | 2/2003 | Flippo | B01D 53/229 | 95/92 |
| 2003/0047070 A1 * | 3/2003 | Flippo | B01D 53/229 | 95/92 |
| 2003/0049182 A1 * | 3/2003 | Hertzler | B01D 53/78 | 422/168 |
| 2003/0054299 A1 * | 3/2003 | Kawamura | B01D 53/68 | 431/5 |
| 2003/0073050 A1 | 4/2003 | Zabriskie | | |
| 2004/0001787 A1 * | 1/2004 | Porshnev | B01D 53/70 | 423/210 |
| 2004/0028590 A1 * | 2/2004 | Tsuji | F23D 14/74 | 423/245.3 |
| 2004/0219469 A1 * | 11/2004 | Katefidis | F23D 14/58 | 431/278 |
| 2005/0135984 A1 * | 6/2005 | Ferron | F23M 5/00 | 423/245.3 |
| 2005/0201913 A1 * | 9/2005 | Shiban | B01D 53/005 | 423/210 |
| 2006/0104878 A1 * | 5/2006 | Chiu | F23K 5/005 | 423/240 R |
| 2006/0120939 A1 * | 6/2006 | Kim | F23G 5/48 | 423/245.3 |
| 2007/0053803 A1 * | 3/2007 | Lee | B01D 47/06 | 422/168 |
| 2007/0172399 A1 | 7/2007 | Clark | | |
| 2007/0214599 A1 * | 9/2007 | Clements | C23C 16/4412 | 15/363 |
| 2007/0217983 A1 | 9/2007 | Stanton et al. | | |
| 2008/0097137 A1 * | 4/2008 | Chapman | F23G 5/02 | 588/311 |
| 2008/0264453 A1 * | 10/2008 | Taylor | C23C 16/4412 | 134/22.18 |
| 2009/0117503 A1 * | 5/2009 | Cain | F23N 1/022 | 431/12 |
| 2009/0148339 A1 * | 6/2009 | Curry | B01D 53/38 | 422/4 |
| 2009/0183684 A1 * | 7/2009 | Radoiu | B01D 53/32 | 118/726 |
| 2009/0214991 A1 * | 8/2009 | Clark | F23G 7/065 | 431/12 |
| 2010/0006227 A1 * | 1/2010 | Radoui | H01J 37/32192 | 156/345.41 |
| 2010/0008838 A1 * | 1/2010 | Fox | G05D 21/02 | 423/240 R |
| 2010/0115961 A1 * | 5/2010 | Chapman | F23G 5/006 | 60/780 |
| 2010/0119984 A1 * | 5/2010 | Fox | B01D 53/38 | 431/114 |
| 2010/0143221 A1 | 6/2010 | Seeley | | |
| 2010/0322604 A1 * | 12/2010 | Fondurulia | C23C 16/4481 | 392/451 |
| 2012/0264070 A1 * | 10/2012 | Zettner | F23K 5/007 | 432/2 |
| 2013/0137051 A1 | 5/2013 | Beyer et al. | | |

(56) References Cited

U.S. PATENT DOCUMENTS

| | | | | |
|---|---|---|---|---|
| 2013/0239857 A1* | 9/2013 | Kim | ............................ | F23G 5/32 |
| | | | | 110/213 |
| 2014/0106282 A1* | 4/2014 | Kim | .......................... | F23G 7/065 |
| | | | | 431/5 |
| 2015/0176838 A1* | 6/2015 | Seeley | ..................... | F23D 14/50 |
| | | | | 431/3 |

FOREIGN PATENT DOCUMENTS

| EP | 0802370 A2 | 10/1997 |
|---|---|---|
| JP | 0912644 H | 1/1997 |
| JP | H09126441 A | 7/2014 |
| KR | 20080074923 A | 8/2008 |
| KR | 20090127903 A1 | 12/2009 |
| WO | 2006013355 A1 | 2/2006 |
| WO | 2008122819 A1 | 10/2008 |
| WO | 2010054291 A2 | 5/2010 |

OTHER PUBLICATIONS

International Search Report and Written Opinion dated Sep. 26, 2014 in corresponding International Application No. PCT/GB2014/051841, 12 pgs.

Search Report and Examination Report under Sections 17 and 18(3) dated Dec. 20, 2013 in GB Application GB1312762.6, 6 pgs.

Text of First Office Action, Chinese Patent Application No. 2014800404836, 6 pgs.

First Office Action from State Intellectual Property Office of China, Chinese Patent Application No. 2014800404836, dated Oct. 28, 2016, 5 pgs.

Search Report from State Intellectual Property Office of China, Chinese Patent Application No. 2014800404836, dated Oct. 28, 2016, 3 pgs.

Office Action dated Sep. 4, 2020 from corresponding Korean application Serial No. 2016-7001120.

* cited by examiner

HEAD ASSEMBLY FOR A RADIANT BURNER

This application is a national stage entry under 35 U.S.C. § 371 of International Application No. PCT/GB2014/051841, filed Jun. 16, 2014, the entire content of which is incorporated herein by reference.

TECHNICAL FIELD

The present invention relates to a head assembly for a radiant burner, an inlet assembly and a method.

BACKGROUND

Radiant burners are known and are typically used for treating an effluent gas stream from a manufacturing process tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream. Typically, the effluent gas stream is a nitrogen stream containing PFCs and other compounds. A fuel gas is mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner being sufficient to consume not only the fuel gas supplied to the burner, but also all the combustibles in the gas stream mixture injected into the combustion chamber.

The range of compounds present in the effluent gas stream and the flow characteristics of that effluent gas stream can vary from process tool to process tool, and so the range of fuel gas and air, together with other gases or fluids that need to be introduced into the radiant burner will also vary.

Although techniques exist for processing the effluent gas stream, they each have their own shortcomings. Accordingly, it is desired to provide an improved technique for processing an effluent gas stream.

SUMMARY

According to a first aspect, there is provided a head assembly for a radiant burner, the head assembly comprising: a housing defining a plurality of identical housing apertures extending therethrough; an insulator received by the housing and defining a corresponding plurality of identical, complimentarily-located insulator apertures extending therethrough; and at least one inlet assembly configured to be received by one of the identical housing apertures, each inlet) assembly comprising: a housing portion configured to be received by the one of the identical housing apertures; and an insulator portion configured to fill the complimentarily-located insulator aperture.

The first aspect recognises that as the range of effluent gases to be processed increases, the possible ranges of configurations for the radiant burner also increases. In particular, different types of effluent gases to be processed may be provided at different rates and in different concentrations. In order to abate or process these different effluent gases, these different effluent gases may need to be distributed in different ways into the combustion chamber of the radiant burner, together with different combinations, concentrations and/or rates of other fluids such as fuel, an oxidant and any other supporting fluids such as for example, air. These varying requirements can lead to complex engineering of the head assembly and the conventional approach is to create a head assembly for each particular application. This complexity is exacerbated by the relatively small size of the radiant burner and it can become complicated to provide for all the necessary couplings and routing of the necessary conduits in order to convey, mix and/or distribute the fluids to the appropriate outlets feeding the combustion chamber. The first aspect also recognises that reconfiguring existing head assemblies to meet these different requirements can be difficult and even impossible, as can be performing maintenance without completely dissembling the radiant burner. This can be extremely disruptive, particularly when some parts of the head assembly require more regular maintenance than others.

Accordingly, a head assembly may be provided. The head assembly may be for a radiant burner. The head assembly may comprise a housing. The housing may define or provide a plurality of housing apertures, each of which may be identical. The housing apertures may extend through the housing. The head assembly may also comprise an insulator. The insulator may be received by the housing. The insulator may define or provide a corresponding plurality of identical insulator apertures. Those insulator apertures may be complementarily or co-located with the housing apertures. The insulator apertures may extend through the insulator. The head assembly may also comprise at least one inlet assembly. The inlet assembly may be configured or dimensioned to be received by, or located in, one of the housing apertures. Each of the inlet assemblies may comprise a housing portion. The housing portion may be configured or dimensioned to be received by the housing aperture. The inlet assembly may also comprise an insulator portion. The insulator portion may be shaped, dimensioned or configured to fill or occupy the insulator aperture. In this way, a head assembly is provided which has a number of apertures, any of which may receive an inlet assembly. Given that each inlet assembly is configured to be received by any of the apertures, this provides flexibility for the insertion and removal of the assemblies, without needing to completely disassemble the head assembly from the radiant burner. Also, by forming the inlet assembly with a housing portion and insulation portion, the assembly can be located within the head assembly and the insulating portion prevents heat damage.

In one embodiment, each identical housing aperture comprises a common fixing arrangement operable to receive any one of a plurality of different inlet assemblies, each inlet assembly having a complimentary common fixing arrangement. Accordingly, each of the inlet assemblies and the housing apertures may utilise the same complementary fixing arrangement or mechanism to enable any differently-configured inlet assembly to be received by any of the apertures. Again, this provides for enormous flexibility when reconfiguring the head assembly.

In one embodiment, each identical housing aperture is distributed across a major face of the housing. Distributing the apertures across at least the major or main face of the housing maximises the available space around the inlet assemblies for coupling to fluid supplies.

In an additional embodiment, the housing comprises at least one other aperture extending therethrough and the insulator comprises at least one complimentarily-located insulator aperture extending therethrough, the at least one other aperture being configured to receive at least one of an inner burner feed assembly, a pilot assembly, a thermocouple assembly and a sight glass assembly. Accordingly, the housing may also accommodate other assemblies necessary for the correct functioning of the radiant burner.

In a further embodiment, the housing portion is configured to receive at least one fluid from a corresponding fluid supply and to convey at least one fluid to a corresponding outlet for supply to a combustion chamber of the radiant burner. Accordingly, there may be a one-to-one correlation between inlets for fluids received by the inlet assembly and outlets which supply those fluids to the combustion chamber.

In another embodiment, the housing portion is configured to convey at least one fluid to a plurality of outlets for supply to a combustion chamber of the radiant burner. Accordingly, some inlet assemblies may provide a one-to-many relationship between inlets for fluids received by the inlet assembly and outlets which supply those fluids to the combustion chamber in order to distribute the fluid received from an inlet to many outlets within the combustion chamber.

In an additional embodiment, the housing portion is configured to receive a plurality of fluids from a corresponding plurality of fluid supplies and to convey the plurality of fluids to an outlet for supply to a combustion chamber of the radiant burner. Accordingly, some inlet assemblies may provide a many-to-one relationship between fluid inlets for fluids received by the inlet assembly and outlets which supply those fluids to the combustion chamber in order to combine fluids provided by an outlet.

In a further embodiment, the housing portion comprises at least one cleaning mechanism operable to clean a corresponding outlet. Cleaning the outlet(s) may be necessary in order to remove accumulated deposits.

In another embodiment, the housing defines a gallery operable to distribute fluid from the inner burner feed assembly to a plenum of the radiant burner coupleable to the head assembly. Providing a gallery or plenum is a convenient arrangement to both provide fuel and oxidant to an inner burner, as well as to a plenum surrounding a foraminous burner.

In yet another embodiment, the housing and the insulator together define the gallery. By shaping the housing and insulator it is possible to provide the gallery. This helps to minimise the number of parts.

In a further embodiment, the housing portion is configured to extend through the gallery. Extending the housing portion through the gallery helps to ensure that no leakage from the gallery occurs.

In another embodiment, each outlet extends at least partially through a corresponding outlet aperture of the insulating portion. Accordingly, the outlet may fail to extend fully through the aperture of the insulating portion, may finish flush with the aperture of the insulating portion, or may extend past the aperture of the insulating portion, depending on the conditions within the combustion chamber.

In a further embodiment, the insulator portion is configured to at least partially surround the outlet.

According to a second aspect, there is provided a head assembly method, comprising: providing a housing defining a plurality of identical housing apertures extending therethrough; receiving an insulator by the housing, the insulator defining a corresponding plurality of identical, complimentarily-located insulator apertures extending therethrough; and receiving at least one inlet assembly with one of the identical housing apertures, each inlet assembly comprising a housing portion configured to be received by the one of the identical housing apertures and an insulator portion configured to fill the complimentarily-located insulator aperture.

In a further embodiment, the method comprises providing each identical housing aperture with a common fixing arrangement operable to receive any one of a plurality of different inlet assemblies and providing each inlet assembly with a complimentary common fixing arrangement.

In another embodiment, each identical housing aperture is distributed across a major face of the housing.

In yet another embodiment, the method comprises providing the housing with at least one other aperture extending therethrough and the insulator with at least one complimentarily-located insulator aperture extending therethrough and receiving at least one of an inner burner feed assembly, a pilot assembly, a thermocouple assembly and a sight glass assembly in at least one other aperture.

In a further embodiment, the method comprises receiving at least one fluid from a corresponding fluid supply with the housing portion and conveying at least one fluid to a corresponding outlet for supply to a combustion chamber of the radiant burner.

In another embodiment, the method comprises conveying at least one fluid to a plurality of outlets for supply to a combustion chamber of the radiant burner.

In yet another embodiment, the method comprises receiving a plurality of fluids from a corresponding plurality of fluid supplies with the housing portion and conveying the a plurality of fluids to an outlet for supply to a combustion chamber the radiant burner.

In a further embodiment, the method comprises providing at least one cleaning mechanism with the housing portion to clean a corresponding outlet.

In another embodiment, the method comprises defining a gallery with the housing to distribute fluid from the inner burner feed assembly to a plenum of the radiant burner coupleable to the head assembly.

In yet another embodiment, the housing and the insulator together define the gallery.

In a further embodiment, the method comprises extending the housing portion through the gallery.

In another embodiment, the method comprises extending each outlet at least partially through a corresponding outlet aperture of the insulating portion.

In yet another embodiment, the method comprises at least partially surrounding the outlet with the insulator portion.

According to a third aspect, there is provided an inlet assembly configured to be received by one of identical housing apertures of a housing of a head assembly for a radiant burner, the inlet assembly comprising: a housing portion configured to be received by the one of the identical housing apertures, and an insulator portion configured to fill a complimentarily-located insulator aperture of an insulator received by the housing.

In one embodiment, the inlet assembly comprises a complimentary common fixing arrangement operable to be received by a common fixing arrangement of each identical housing aperture.

In another embodiment, the housing portion is configured to receive at least one fluid from a corresponding fluid supply and to convey at least one fluid to a corresponding outlet for supply to a combustion chamber of the radiant burner.

In a further embodiment, the housing portion is configured to convey at least one fluid to a plurality of outlets for supply to a combustion chamber of the radiant burner.

In yet another embodiment, the housing portion is configured to receive a plurality of fluids from a corresponding plurality of fluid supplies and to convey the plurality of fluids to an outlet for supply to a combustion chamber of the radiant burner.

In another embodiment, the housing portion comprises at least one cleaning mechanism operable to clean a corresponding outlet.

In a further embodiment, the housing portion is configured to extend through a gallery defined by the housing to distribute fluid from an inner burner feed assembly to a plenum of the radiant burner coupleable to the head assembly.

In yet another embodiment, each outlet extends at least partially through a corresponding outlet aperture of the insulating portion.

In a further embodiment, the insulator portion is configured to at least partially surround the outlet.

Other preferred and/or optional aspects of the invention are defined in the accompanying claims.

BRIEF DESCRIPTION OF THE DRAWINGS

In order that the present invention may be well understood, an embodiment thereof, which is given by way of example only, will now be described with reference to the accompanying drawing, in which.

DETAILED DESCRIPTION

Overview

Before discussing the embodiments in any more detail, first an overview will be provided. A head assembly is provided which utilises a basic, preconfigured structure into which various different or identical inlet assemblies may be received. This provides for a flexible head assembly configuration which can be easily reconfigured to suit the processing or abatement of effluent gas streams from multiple different sources, and which can enable individual inlet assemblies to be removed for maintenance, when required. Providing such a modular approach gives significant operational and cost advantages.

Head Assembly

Figure 1:
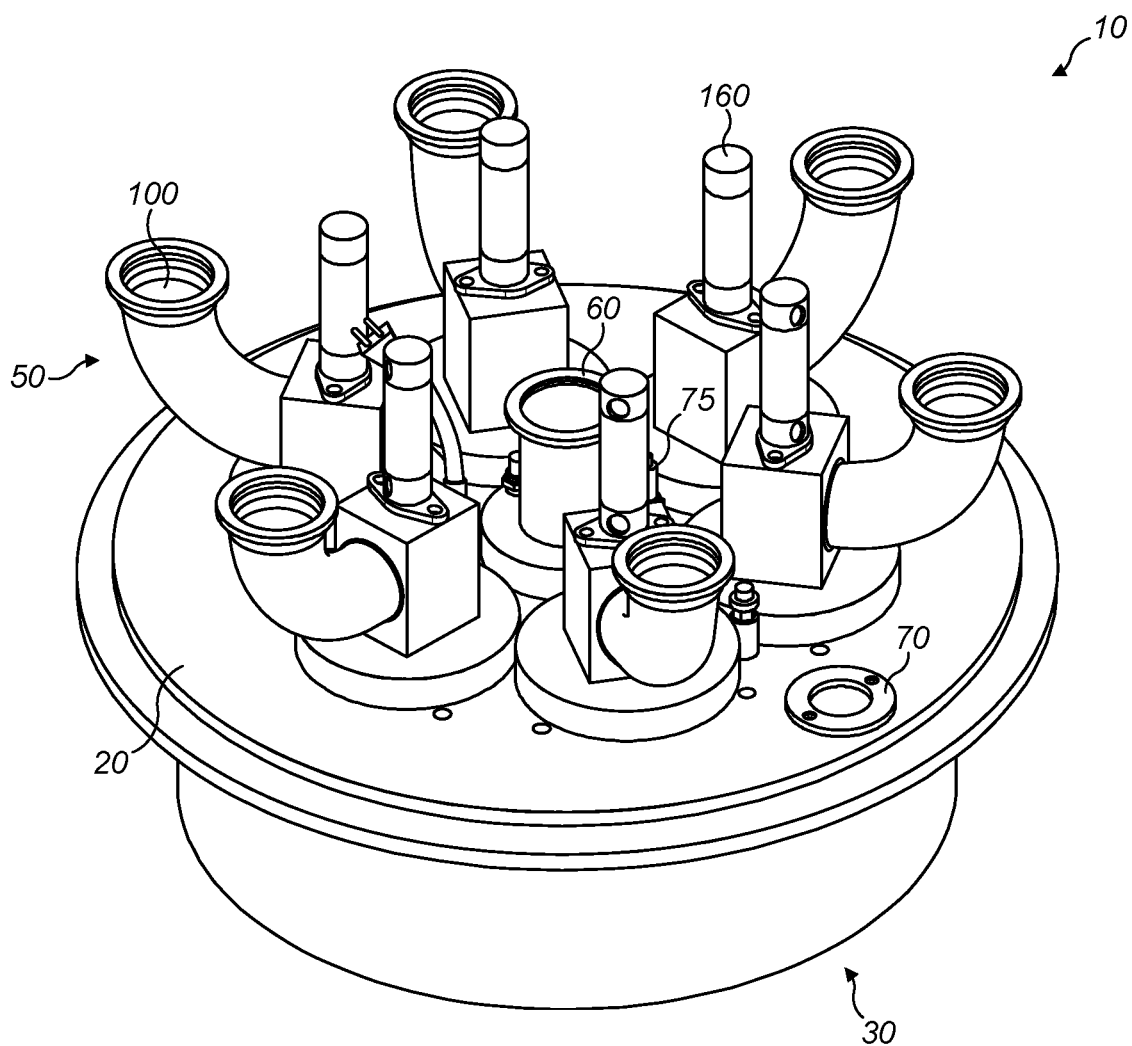
FIG. 1 illustrates a head assembly for a radiant burner according to one embodiment.

FIG. 1 illustrates a head assembly, generally 10, for a radiant burner according to one embodiment. Radiant burners are well known in the art, such as that described in EP 0 694 735. The head assembly comprises three main sets of components. The first is a metallic (typically steel) housing 20, which provides the necessary mechanical strength and configuration for coupling with the remainder of the radiant burner (not shown). The second is an insulator 30 which is provided within the housing 20 and which helps to reduce heat loss from within a combustion chamber (not shown) of the radiant burner, as well as to protect the housing 20 and items coupled thereto from the heat generated within the combustion chamber. The third are inlet assemblies 50 which are received by a series of identical, standardized apertures 40 (see FIG. 2A) provided in the housing 20. These inlet assemblies 50 may be provided with different configurations of inlets and outlets, or with other features, in order to suit different effluent gas abatement or processing requirements and to support the functioning of the radiant burner. However, each of the different inlet assemblies 50 is configured to fit with each of the apertures 40. This provides the flexibility to maintain a consistent configuration into which different inlet assemblies may be fitted, as required. Also, this arrangement enables individual inlet assemblies 50 to be removed for maintenance, without needing to remove or dissemble the complete head assembly 10 from the remainder of the radiant burner.

The embodiment shown in FIG. 1 utilises six identical inlet assemblies 50, each mounted within a corresponding one of six apertures 40. However, it will be appreciated that any one or more of the inlet assemblies 50 may have a different configuration, provided that they can still be received within the aperture 40. Also, it will be appreciated that not every aperture 40 may be filled with an inlet assembly 50 which receives an effluent or process fluid, or other fluid, and may instead receive a blanking inlet assembly to completely fill the aperture 40, or may instead receive an instrumentation inlet assembly housing sensors in order to monitor the conditions within the radiant burner. Also, it will be appreciated that greater or fewer than six apertures 40 may be provided, that these need not be located circumferentially around the housing, and that they need not be located symmetrically either.

Figure 2A:
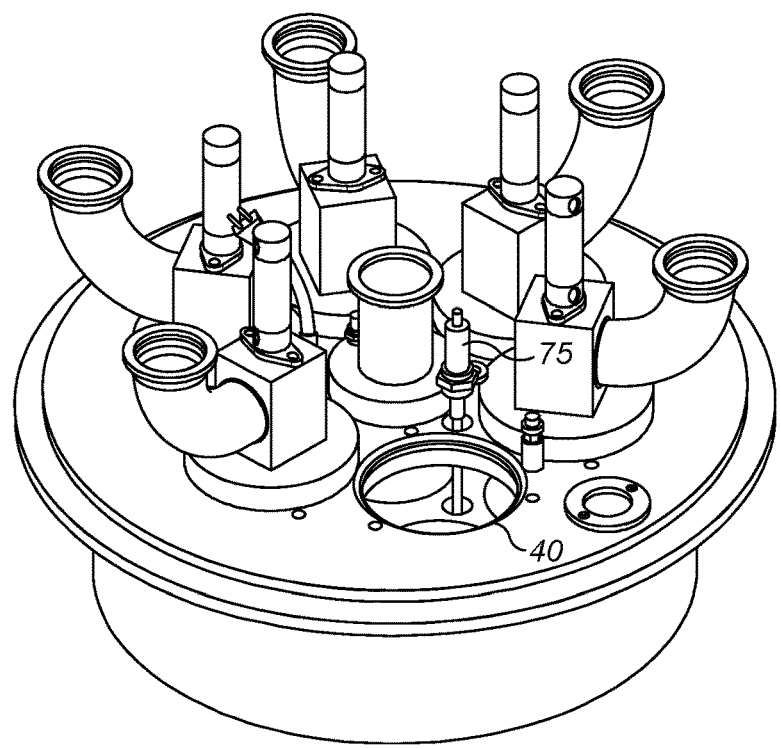
FIGS. 2A and 2B illustrate the head assembly of FIG. 1 but with one inlet assembly removed.
Figure 2B:
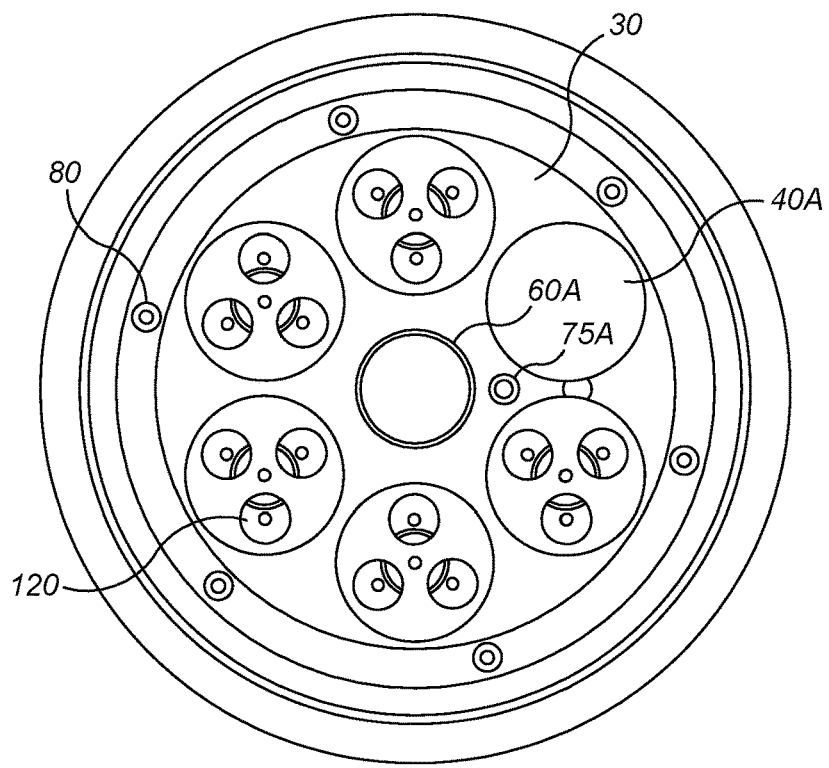

As can also be seen in FIG. 1, additional apertures are provided in the housing 20 in order to provide for other items such as, for example, a feed 60 for an inner burner 60A (see FIG. 2B), a sight glass 70 and a feed 75 for a pilot 75A (see FIG. 2B).

FIGS. 2A and 2B illustrate the head assembly of FIG. 1, but with one of the inlet assemblies removed.

As can be seen in more detail in FIG. 2B (which is an underside view of the head assembly), the insulator 30 is provided with apertures 40A which align with the apertures 40. Although in this embodiment the apertures 40A are the same diameter as those apertures 40 extending through the housing 20, it will be appreciated that this need not be the case and that they may be smaller. Also, although this arrangement shows the two apertures 40, 40A arranged co-axially, it will be appreciated that this again need not be the case and that they may be axially offset. In such an arrangement it would be preferable for the height of a gallery (mentioned in more detail below) to be greater than the height of an insulator portion of the inlet assembly (mentioned in more detail below) or for the insulator portion to be smaller than the housing portion (mentioned in more detail below) and 'under its shadow' (i.e. the insulator portion extends no further radially than the housing portion).

The inlet assemblies 50 are retained using suitable fixings such as, for example, bolts (not shown) which are removed in order to facilitate their removal. As can also be seen in FIG. 2A, one internal major surface of the housing 20 is spaced away from an opposing major surface of the insulator 30 to create a gallery through which fluids may be conveyed. In this embodiment, the gallery couples with the feed 60 of the inner burner 60A in order to convey fuel and oxidant via the apertures 80 into a plenum (not shown) surrounding a foraminous gas burner (not shown) of the radiant burner.

Inlet Assembly

An effluent or process gas stream is provided via an inlet 100 of the inlet assembly 50 and is conveyed to each of three outlets 120. An actuator 160 is provided which activates a cleaning mechanism to remove deposits from within the outlets 120. The inlet assembly 50 comprises a housing portion and an insulator portion. The housing portion is generally metallic and provides the required mechanical strength for fixing the inlet assembly 50 to the housing 20 and for supporting the coupling of the necessary conduits which supply the fluid and also to support the operation of mechanisms within the inlet assembly 50. The housing portion is generally received within the aperture 40 which falls within the housing and gallery, if present. The insulator portion is generally received within the aperture 40A provided by the insulator 30. The fit between the outer surface of the insulator portion and the surface of the aperture 40A provided by the insulator 30 should be sufficiently tight to prevent heat from damaging the housing portion. If the gallery is present, the fit between the insulator portion and the aperture 40A provided by the insulator 30 needs to be good, otherwise some of the fluid that flows through the gallery will leak directly into the combustion chamber without passing through the (outer) foraminous burner; suitable sealing means should be provided at the cold end of the insulator portion to prevent this. In one embodiment, a deformable component is provided between the housing portion and insulator portion, which is larger in diameter than the aperture 40A and is deformably received within the aperture 40A. The housing portion and the insulating portion are held together by fixings (not shown) located within fixing apertures (not shown), which are then sealed using a temperature resistant to sealant.

Figure 3A:
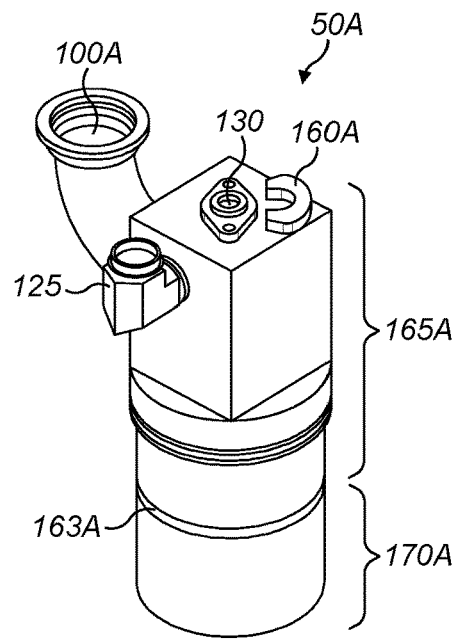
FIGS. 3A and 3B illustrate an inlet assembly according to another embodiment.
Figure 3B:
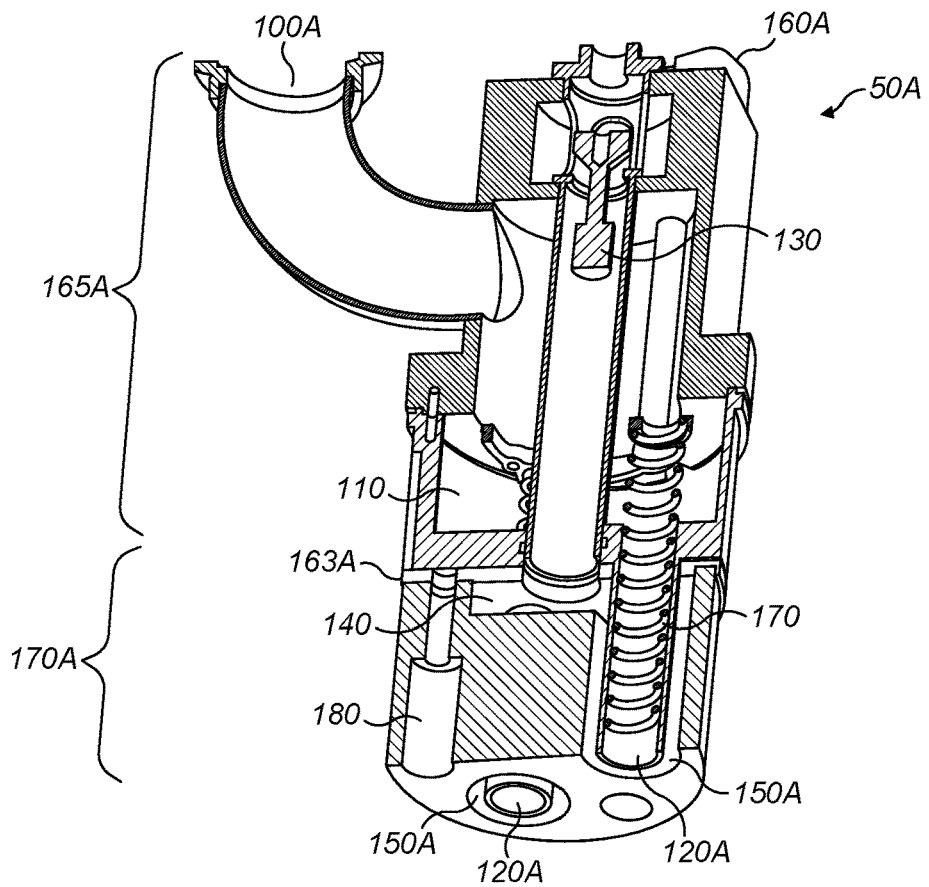

FIGS. 3A and 3B illustrate an inlet assembly 50A according to one embodiment. As shown in FIG. 3A, an effluent or process gas stream is provided via an inlet 100A and is conveyed to at least one process stream outlet (not shown). Air is received via an air inlet 125 and is conveyed via an air modulating valve 130 to air outlets (not shown) which concentrically surround the process stream outlets. An actuator 160A is provided which activates a cleaning mechanism (not shown) to remove deposits from within the outlets. The inlet assembly 50A comprises a housing portion, generally 165A, and an insulator portion, generally 170A. The housing portion 165A is generally metallic and provides the required mechanical strength for fixing the inlet assembly 50A to the housing 20 and for supporting the coupling of the necessary conduits which supply the fluid and also to support the operation of mechanisms within the inlet assembly 50A. The housing portion 165A is generally received within that part of the aperture 40 which falls within the housing and gallery, if present. The insulator portion 170A is generally received within that portion of the aperture 40A provided by the insulator 30. The fit between the outer surface of the insulator portion 170A and the surface of the aperture 40A provided by the insulator 30 should be sufficiently tight to prevent heat from damaging the housing portion 165A. A deformable component 163A is provided between the housing portion and insulator portion, which is larger in diameter than the aperture 40A and is deformably received within the aperture 40A. The housing portion 165A and the insulating portion 170A are held together by fixings (not shown).

As can be seen in FIG. 3B, which illustrates a section through the inlet assembly 50A, an effluent or process gas stream is provided via the inlet 100A and is conveyed via a chamber 110 to each of the three outlets 120A. Air is received via the air inlet (not shown) and is conveyed via the modulating valve 130 and a chamber 140 to the three outlets 150A which concentrically surround the outlets 120A. The actuator 160A activates a cleaning mechanism 170 to remove deposits from within the outlets 120A. The inlet assembly 50A comprises a housing portion, generally 165A, and an insulator portion, generally 170k The housing portion 165A and the insulating portion 170A are held together by fixings (not shown) located within fixing apertures 180, which are then sealed using a temperature-resistant sealant.

Figure 4A:
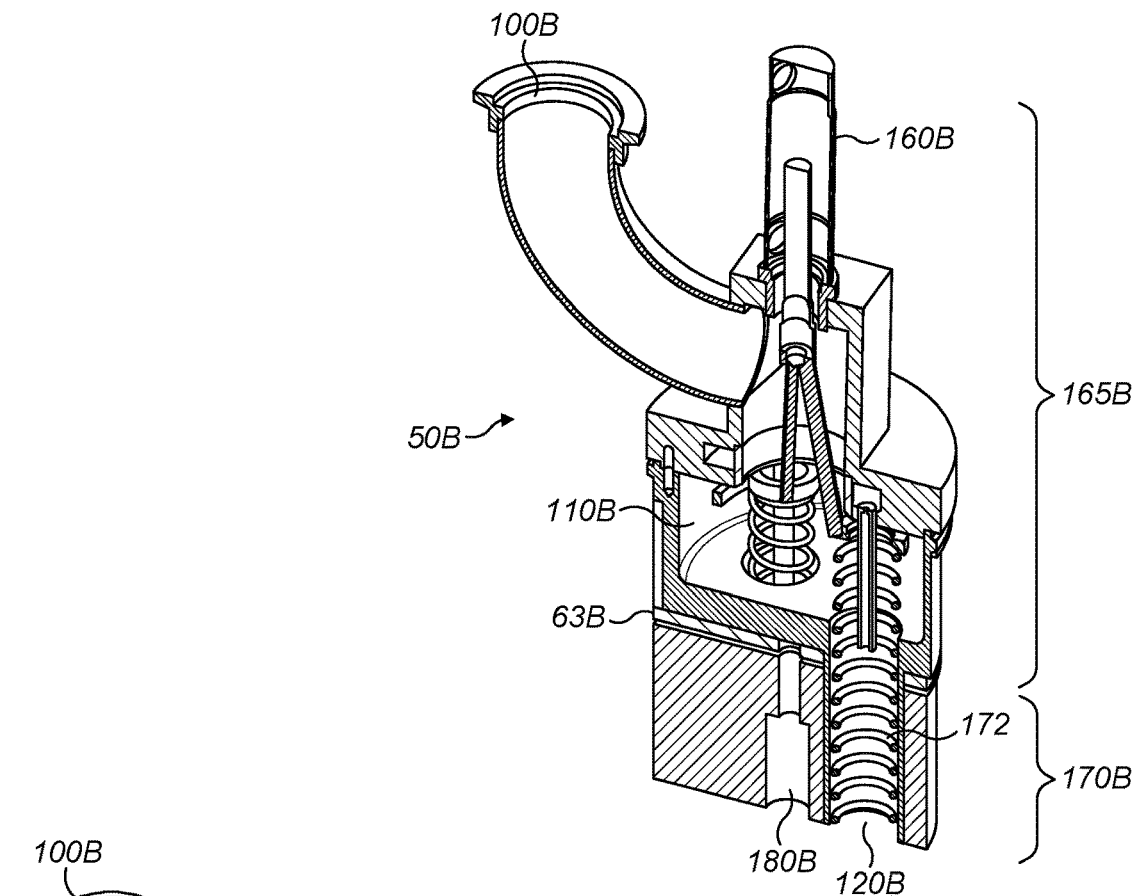
FIGS. 4A and 4B illustrate an inlet assembly according to a further embodiment.
Figure 4B:
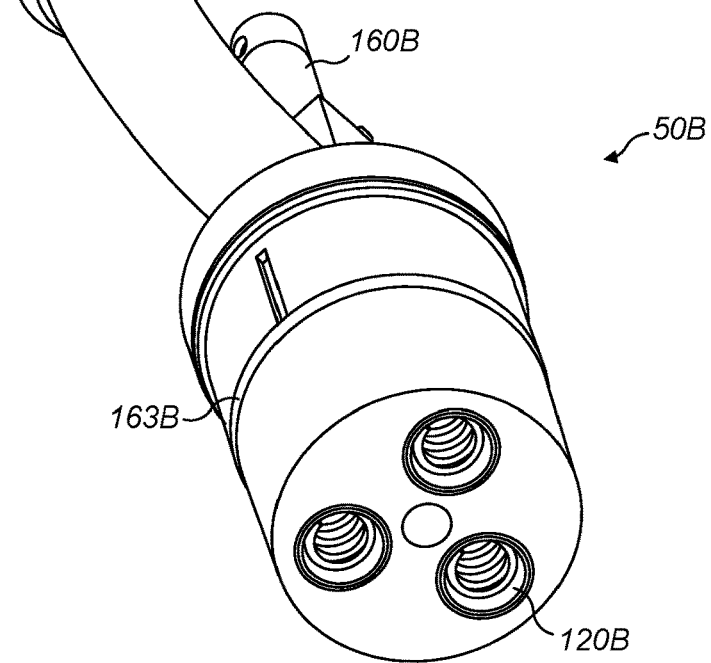

FIGS. 4A and 4B illustrate an inlet assembly 50B according to one embodiment. As shown in FIG. 4A, which illustrates a section through the inlet assembly 50B, an effluent or process gas stream is provided via an inlet 100B and is conveyed via a chamber 110B to each of the three outlets 120B. An actuator 160B is provided which activates a cleaning mechanism 172 to remove deposits from within the outlets 120B. The inlet assembly 50B comprises a housing portion, generally 165B, and an insulator portion, generally 170B. The housing portion 165B is generally metallic and provides the required mechanical strength for fixing the inlet assembly 50B to the housing 20 and for supporting the coupling of the necessary conduits which supply the fluid and also to support the operation of mechanisms within the inlet assembly 50B. The housing portion 165B is generally received within that part of the aperture 40 which falls within the housing and gallery, if present. The insulator portion 170B is generally received within that portion of the aperture 40A provided by the insulator 30. The fit between the outer surface of the insulator portion 170B and the surface of the aperture 40A provided by the insulator 30 should be sufficiently tight to prevent heat from damaging the housing portion 165B. A deformable component 163B is provided between the housing portion and insulator portion, which is larger in diameter than the aperture 40A and is deformably received within the aperture 40A. The housing portion 165B and the insulating portion 170B are held together by fixings (not shown) located within fixing apertures 180B, which are then sealed using a temperature-resistant sealant.

Accordingly, it can be seen that embodiments recognise that combustion of semiconductor waste gases often requires different configuration of the inlets to give optimal destruction of the gases. Ordinarily, in a system comprising at least a combustion chamber and an inlet head assembly, the configuration is fixed at the time of manufacture. Field upgrade (to accommodate process change or inaccurate specification) may well involve the complete exchange of the inlet head assembly. In extreme cases, non-standard parts may need to be manufactured.

Embodiments also recognise that it would be advantageous to have available an arrangement where the function of closing off the combustion chamber (and additional support functions such as pilot, flame management) is performed by one substantial assembly. In addition, each of the process inlets would be introduced as a functionally complete sub-assembly, allowing the system to be configured and re-configured at will.

Embodiments also recognise that a secondary advantage would be that for inlet maintenance procedures, only the respective inlet(s) would need to be removed, not the whole head assembly. For larger systems with heavy parts (such as systems designed for high flows seen in flat panel/solar processing and anticipated for 450 mm silicon wafer processing) this dramatically simplifies the cleaning process.

The burner system comprises a combustion chamber, such as, but not limited to, for example, a foraminous burner as described in U.S. Pat. No. 5,510,093, open at both ends. The upper end is closed off by a metal flange of a head assembly according to embodiments. This has a lining of a cast ceramic fibre or other refractory material attached to it to act as a thermal insulator, protecting the metallic part(s) from thermal damage and minimising the thermal losses from the system. This flange may carry the pilot burner, thermocouple, sight glass and other features as necessary for the operation of the burner. A number of large ports are cut through the flange and the ceramic insulator so as to form passages directly into the combustion chamber. Into these ports or passages, the individual inlet assemblies are fitted.

The head assembly comprises an inlet pipe, a plenum and a plurality of inlet nozzles, through which the process gases flow into the combustion chamber. The underside of the inlet plenum is fitted with a ceramic insulator in like manner to the inlet head. This insulator substantially fills the passageway in the inlet head, preventing the egress of hot gases from the combustion chamber. Elastomer seals may be fitted at the "cold" end between the flange and the plenum to make the assembly gas tight.

Note that different materials may be used for the inlets and the head flange, as only the inlets are in contact with process gases. For example, the inlets may be fashioned from a stainless steel, whereas the head flange may be an aluminium alloy.

The inlets may take a variety of forms for example a plurality of simple nozzles as described in U.S. Pat. No. 5,510,093, or nozzles with co-axial lances arranged for the supply of $O_2$, with additional fuel pre-mixed into the process gas stream as described in EP 0802370, or nozzles with a concentric passage and a co-axial lance as described in WO 2006/013355, or simple nozzles with large concentric excess air passages for combustion of process gases with a high $H_2$ component.

The inlet nozzles may be separate from the plenums or cast together in one piece. In one piece, the plenum and nozzles may be cast from a high temperature alloy such as ANC16 (equivalent to Inconel 600) or ANC5 (equivalent to SS310) depending on requirements.

The lower end of the combustion chamber forms the outlet, through which combusted gases discharge to receive further treatment, such as air cooling, water cooling, wet scrubbing etc., as currently practised.

Although embodiments relate to a burner with an annular combustion chamber, it will be appreciated that is equally applicable to other forms of combustor.

It will be appreciated that separating the inlet function from the head (combustion chamber closing) function enables inlets to be separately removable. This in turn results in the option to fit any such inlet as required without the need to disturb other inlets or the head.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. An inlet assembly configured to be received by at least one identical housing aperture of a housing of a head assembly for a radiant burner, the inlet assembly comprising:
    (a) a housing portion configured to be inserted into at least one of the identical housing apertures;
    (b) an insulator portion configured to be inserted into and fill a complimentarily-located insulator aperture of an insulator received by the housing as the housing portion is inserted into at least one of the identical housing apertures wherein the insulator portion comprises a block of ceramic material having an outer surface wherein a surface of the insulator aperture is fit to the outer surface of ceramic material and in the block of ceramic material are defined a plurality of outlet apertures through which a plurality of outlets configured to provide an effluent gas stream at least partially extend; and
    (c) a deformable component located between the housing portion and the insulator portion and configured to be deformably inserted into the complimentarily-located insulator aperture.

2. A head assembly method, comprising:
    (a) providing a housing defining a plurality of identical housing apertures extending there through;
    (b) receiving an insulator by the housing, the insulator defining a corresponding plurality of identical, complimentarily-located insulator apertures extending there through; and
    (c) receiving at least one inlet assembly within one of the identical housing apertures such that the inlet assembly is removable from the housing without removing the housing from a burner;
    wherein each inlet assembly includes a housing portion configured to be received by one of the identical housing apertures, an insulator portion configured to fill the complimentarily-located insulator aperture and a deformable component located between the housing portion and the insulator portion and configured to be deformably received within the complimentarily-located insulator aperture, wherein the insulator portion comprises a block of ceramic material having an outer surface wherein a surface of the insulator aperture is fit to the outer surface of the ceramic material and in the block of ceramic material are formed a plurality of outlet apertures through which a plurality of outlets at least partially extend and are configured to provide an effluent gas stream.

3. A head assembly for a radiant burner, the head assembly comprising:
    (a) a housing defining a plurality of identical housing apertures extending there through;
    (b) an insulator received by the housing and defining a corresponding plurality of identical, complimentarily-located insulator apertures extending there through; and
    (c) at least one inlet assembly configured to be received by one of the identical housing apertures such that each inlet assembly is removable from the housing without removing the housing from the radiant burner;
    wherein each inlet assembly includes:
        a housing portion configured to be received by one of the identical housing apertures,
        an insulator portion configured to fill the complimentarily-located insulator aperture and comprising a block of ceramic material having an outer surface wherein a surface of the insulator aperture is fit to the outer surface of the ceramic material and the block of ceramic material has a plurality of outlet apertures formed therein and for each outlet aperture, a respective outlet that extends at least partially through the outlet aperture and is configured to provide an effluent gas stream; and
        a deformable component between the housing portion and the insulator portion that is larger than the complimentarily-located insulator aperture and is configured to be deformably received by the complimentarily-located insulator portion.

4. The head assembly of claim 3, wherein each identical housing aperture comprises a common fixing arrangement operable to receive any one of a plurality of different inlet assemblies, each inlet assembly having a complimentary common fixing arrangement.

5. The head assembly of claim 3, wherein each identical housing aperture is distributed across a major face of the housing.

6. The head assembly of claim 3, wherein the housing comprises at least one other aperture extending there through and the insulator comprises at least one complimentarily-located insulator aperture extending there through, wherein the other aperture being configured to receive at least one of an inner burner feed assembly, a pilot assembly, a thermocouple assembly and a sight glass assembly.

7. The head assembly of claim 3, wherein the housing portion is configured to receive at least one fluid from a corresponding fluid supply and to convey the fluid to a corresponding outlet for supply to a combustion chamber of the radiant burner.

8. The head assembly of claim 7, wherein the housing portion is configured to convey the fluid to the plurality of outlets for supply to the combustion chamber of the radiant burner.

9. The head assembly of claim 7, wherein the housing portion is configured to receive a plurality of fluids from a corresponding plurality of fluid supplies and to convey the plurality of fluids received to an outlet for supply to the combustion chamber of the radiant burner.

10. The head assembly of claim 3, wherein the housing portion further comprises at least one cleaning mechanism operable to clean a corresponding outlet.

* * * * *